United States Patent [19]
Harr

[11] Patent Number: 5,993,137
[45] Date of Patent: Nov. 30, 1999

[54] ADJUSTABLE HOIST FOR USE WITH VEHICLE

[76] Inventor: Robert E Harr, 511 S. Kendrick, Gillette, Wyo. 82716

[21] Appl. No.: 08/797,131

[22] Filed: Feb. 10, 1997

[51] Int. Cl.$^6$ ........................................................ B60P 1/54
[52] U.S. Cl. .......................... 414/550; 414/462; 414/543; 414/718; 280/415.1; 224/519; 212/253; 212/238
[58] Field of Search ................... 104/35, 45, 46, 104/47; 414/462, 539, 540, 541, 542, 543, 560, 718, 399, 392, 550, 921; 212/253, 238, 261; 280/415.1; 254/2 R, 4 R; 224/281, 511, 518, 519

[56] References Cited

U.S. PATENT DOCUMENTS

| | | | |
|---|---|---|---|
| 1,874,189 | 8/1932 | Howard | 414/543 X |
| 4,069,922 | 1/1978 | Hawkins | 414/543 X |
| 4,508,233 | 4/1985 | Helms | 414/543 X |
| 4,881,864 | 11/1989 | Amato | 414/543 |
| 5,205,700 | 4/1993 | Linetal | 414/550 X |
| 5,211,526 | 5/1993 | Robinette | 414/543 X |
| 5,445,487 | 8/1995 | Koscinski, Jr. | 414/543 |
| 5,520,498 | 5/1996 | Di Bartolomeo | 414/550 X |

FOREIGN PATENT DOCUMENTS 505639  9/1992  European Pat. Off. ............... 414/540

*Primary Examiner*—Frank E. Werner

[57] ABSTRACT

A hoist for raising and lowering objects may be attached to a vehicle. The hoist includes a support column and a boom attached thereto; the boom can be raised and lowered by a hydraulic double action cylinder or otherwise. Both the support column and cylinder attach to a bracket, the bracket in turn being rotatably connected to a base unit so that the boom can be rotated as well as raised and lowered. The support column and boom can be adjusted with respect to one another and to the bracket, to balance loads and to adjust the reach of the hoist. Critical sections of the hoist, such as the portion of the boom that attaches to the support column, are reinforced with plates welded to the exterior of a rectangular tube. The connection between the support column and the bracket includes a nut to tension the column to the bracket. The base unit includes outriggers to support and stabilize the hoist, preferably three outriggers in a triangular configuration. Adjustments to the hoists can be made by inserting and removing penetrating pins through adjustment holes in the hoist members, which are quick and easy to make as well as strong and reliable.

11 Claims, 4 Drawing Sheets

ADJUSTABLE HOIST FOR USE WITH VEHICLE

FIELD OF THE INVENTION

The present invention relates to the field of hoists, cranes, and lifting devices, and more particularly to an adjustable hoist attachable to a vehicle.

BACKGROUND OF THE INVENTION

Hoists for raising and lowering objects have been known since antiquity, and in more modern times hoist have been developed that may be attached to a vehicle. A boom capable of 360 degree rotation is described in U.S. Pat. No. 4,881,864 of Amata (1989). U.S. Pat. No. 5,029,740 of Cox (1991) describes construction features such as square or rectangular tubular structural members, concentrically cooperating with a trailer hitch, drawbar, hand operated connectors, and a frame permitting rollabout operation of the crane when it is not connected to a vehicle. U.S. Pat. No. 4,527,935 of Fortenberry (1985) discloses a trailer having an adjustable steadying and load supporting outrigger.

U.S. Pat. No. 5,211,526 of Robinette (1993) discloses a mobile crane attachable to a vehicle drawbar and other surfaces. The Robinette device provides a measure of adjustability. It has a telescopic boom, and two outriggers of adjustable height. However, it is not fully adjustable, in that the boom lifting means (such as a hydraulic jack) is fixedly attached to a support column and boom. There is no way to adjust the height of the support column, or the attachment position between the boom and support column. The Robinette device may be suitable for lifting and moving relatively light loads, but it could fail and possibly cause injury if it were attempted to be used to lift relatively heavy objects such as, by way of example, an automobile engine. The boom of Robinette has a "support member," but attaches to the central column at a simple through hole penetrating the boom, which could fail at high loads. Set screws secure the position of the crane against unwanted rotation to some extent, but they too could fail at high loads. Further, the connection between the lifting means and the central column places high stress on the column, and raises the center of gravity of the device. The rotation mechanism between the central column and receiver may well serve some purposes, but does not provide a tensioning force between the column and the receiver and consequently could fail, particularly when heavy loads are moving on the boom. The Robinette device is only described herein to illustrate the differences between the known prior art and the present invention described, which provides an adjustable crane of greater intrinsic strength, adjustability, and convenience of use, among other advantages, than has heretofore been known.

SUMMARY OF THE INVENTION

The present invention is an adjustable hoist for raising and lowering objects. The hoist is preferably adapted for attachment to a vehicle, but also has other applications.

The hoist has a support column and a boom extending therefrom. The support column is attached to a bracket that is in turn attached to a base unit. The bracket swivels 360 degrees around the base unit, and may be securely locked thereto to prevent unwanted (and possibly dangerous) rotation when the hoist is used for lifting and lowering. A means for raising and lowering the device, such as a hydraulic double action cylinder, is attached to boom and the bracket.

Some of the objects of the present invention are to provide a hoist that:

is easily assembled and disassembled;

it is adapted for use with a vehicle;

uses telescoping tubing as adjustable structural members;

uses fasteners that are strong as well as easy and quick to place;

has a low center of gravity, while also having good reach, that is, being able to attach to loads at a variety of positions;

provides a plurality of outriggers that stabilize and support the hoist;

has a low friction yet strong and reliable rotatable attachment between the boom and the support column; and is rugged an strong and achieves maximum lifting capacity for a given size.

These objects are not meant to be inclusive of all of the advantages of the present invention.

DETAILED DESCRIPTION OF THE INVENTION

The present invention is a hoist particularly suited for attachment to a vehicle. Attachment to a vehicle enables a user to use the hoist to introduce objects into and remove objects from the vehicle, and also allows the hoist to be transported to a work site. However, the hoist of the present invention is not limited to vehicular use.

Figure 1:
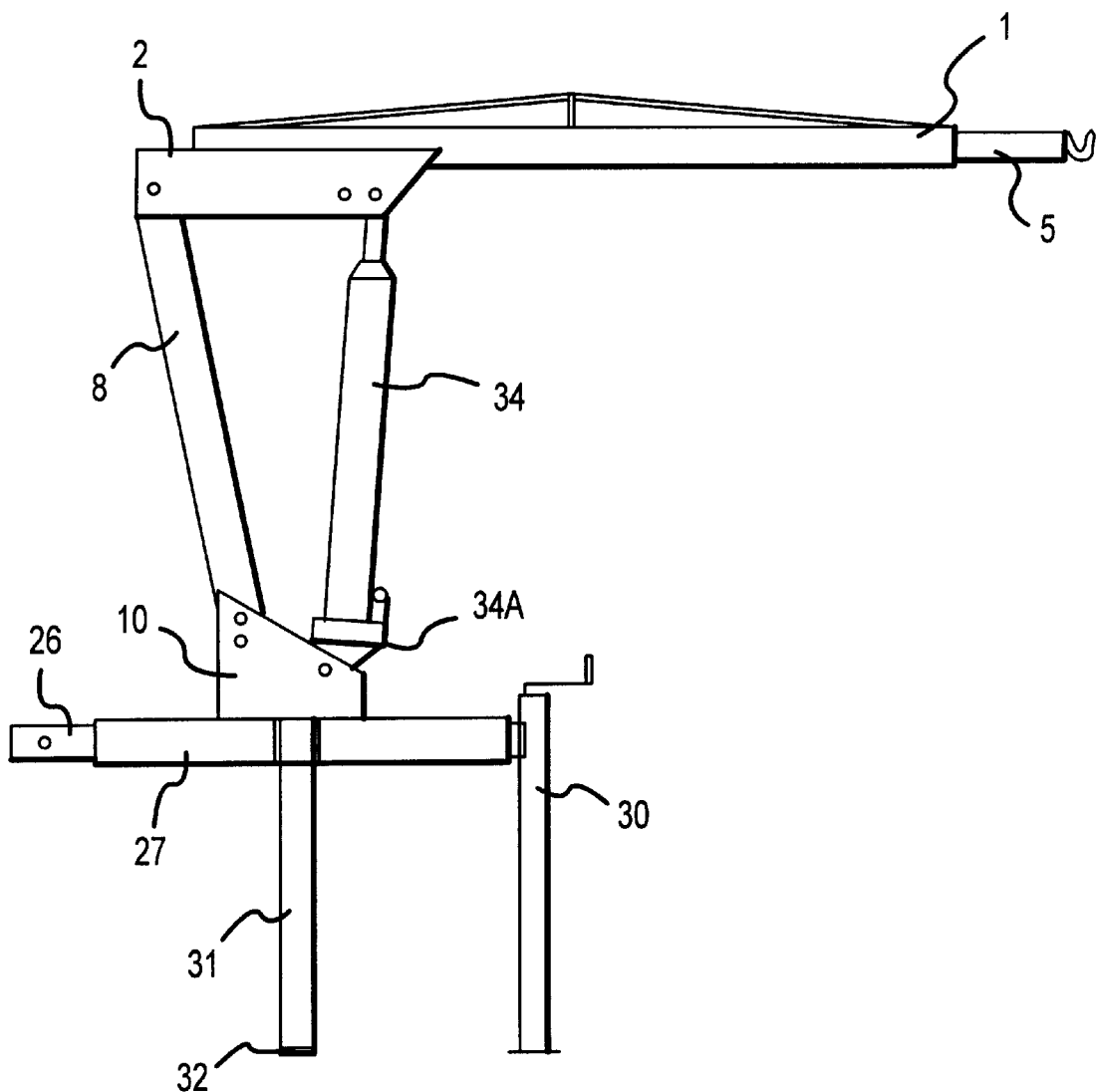
FIG. 1 is a side elevation of an embodiment of the present invention with certain elements omitted for clarity.
Figure 2:
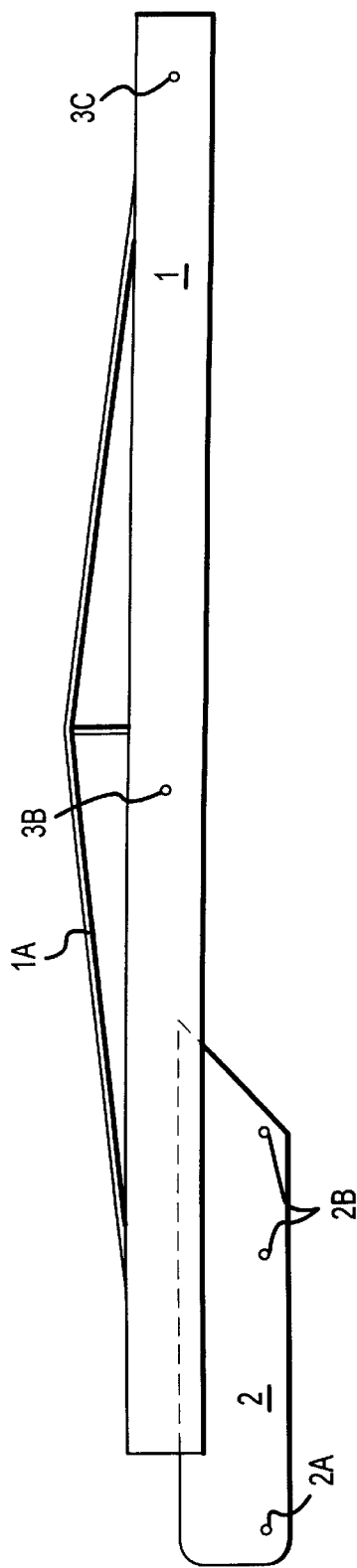
FIGS. 2, 3, and 4 are side elevation views of a boom member according to an embodiment the present invention.
Figure 3:
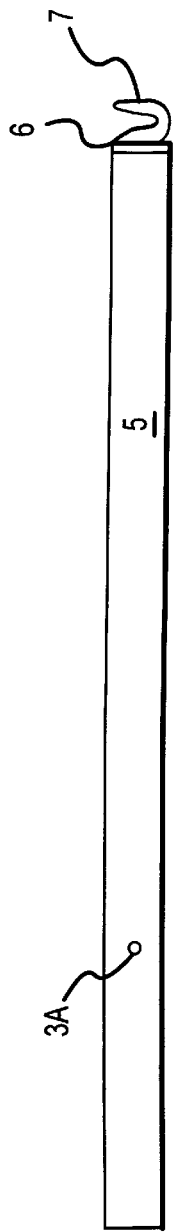

The hoist includes a boom for lifting and moving objects. Referring now to FIG. 1, a main boom section (1) and boom extension (5) are telescopically engaged with one another, so that tube (5) may be extended a desire distance from main boom (1) and the boom may be set to a desired length. Tubes (1) and (5) are fixed relative to one another by a penetrating pin that may be inserted through a hole (3A) in tube (5) and through a hole (3B or 3C) in tube (1) (see also FIGS. 2 and 3). The amount of extension of tube (5) is determined by the selection of the hole (3B or 3C) in tube (1). In the embodiment shown, two holds (3B or 3C) are shown in tube (1) and one hole (3A) is shown in tube (5), allowing for two positions to be selected. It should be appreciated that more increments of adjustment can be easily achieved by simply increasing the number of holes in tube (1), tube (5), or both. However, additional holes will result in a decrease of the load value of the boom.

Tubes (1) and (5) are preferably formed primarily of rectangular tube steel, which is strong, inexpensive, and well suited for telescopic connections. However, material selection and the precise shape for the tubes are not critical to the practice of the invention. A hook (7) is welded onto a plate (6) welded on the end of tube (5), for attachment of a line or chain for manipulating objects by the hoist.

Figure 4:
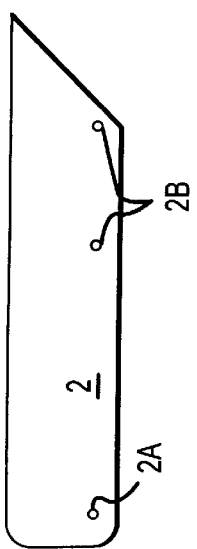

Tube (1) may be strengthened by a truss (1A) that spans the length or a portion of the length of tube (1). The end of tube (1) opposite the end that receives tube (5) has two flat steel plates (2) welded thereto (see FIGS. 2 and 4). The steel plates (2) are welded to the outside of the tube (1). A series of through holes (2A or 2B) penetrate the flat plates (2): these through holes in (2) are for attachment of a support column (8) and boom lifter (34), as further explained below.

Figure 9:
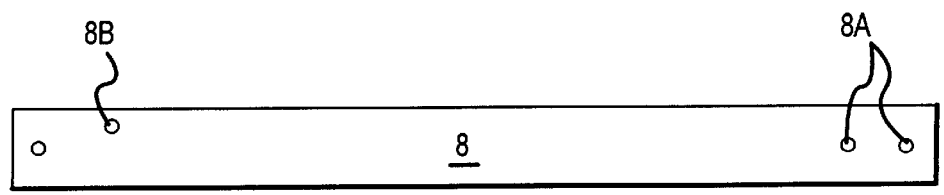
FIG. 9 is a side elevation view of a support column according to an embodiment of the present invention.

Support column (8) is preferably a rectangular tube of similar construction to the tube (1) (see FIG. 9). Adjustment holes (8A), for higher reach on boom, proximate one end of tube (8) allows the tube (8) to be connected to main boom (1), by inserting a pin simultaneously through one of the adjustment holes (8A) and the hole (2A). It should be appreciated that the connection between support column (8) and main boom (1) is pivotal, so that the main boom (1) may be raised and lowered in relation to the column (8) also while pivoting with column (8). As with the tube (1), column (8) may be strengthened by a truss (not shown) that spans the length (or a portion of the length) of the tube (8).

Figure 10A:
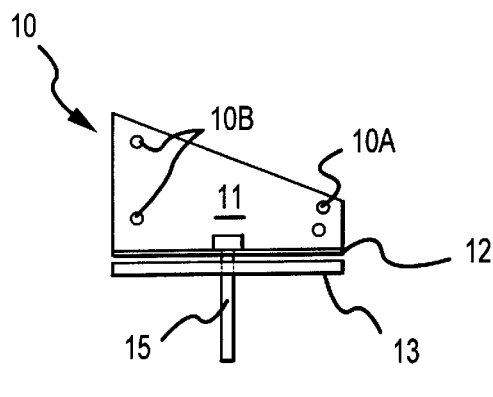
FIG. 10A is a side elevation view of a bracket according to an embodiment of the present invention.
Figure 10B:
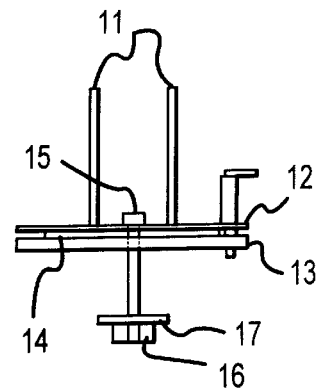
FIG. 10B is a side elevation view of the bracket of FIG. 10 at a different orientation.

The opposite end of column (8) connects to a mounting bracket (10) (see FIGS. 10A and 10B). Holes (8B) of tube (8) align with corresponding holes (10B) in the mounting bracket (10). To prevent rotation between the column (8) and the bracket (10), two pins through two separate hole pairs (8B and 10B) simultaneously are used to attach the column (8) and the bracket (10); this also strengthens the connection.

Figure 5:
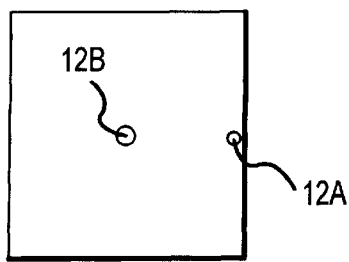
FIG. 5 is a top plan view of a horizonal bracket component according to an embodiment of the present invention.

The bracket (10) preferably has a substantially horizontal base plate (12) (see also FIG. 5) and two spaced vertical plates (11) rising above the base plate (12). Other mounting holes (10A) are formed through the two vertical plates (10). The mounting holes (10A) are for receiving one end of the boom lifter (34).

The boom lifter (34) has a corresponding hole (34A) through one end that allows the lifter (34) to be attached to the bracket (10) at the mounting holes (10A), via a pin as described above in connection with other attachments. The opposite end of the boom lifter (34) is connected to the main boom (1) at the holes (2B) as shown in (FIG. 1). The holes (2B) are adjustment holes to allow the boom (1) a higher lift height or more lift capacity, whichever is preferred depending on the application.

The boom lifter (34) is most preferably a double action hydraulic cylinder, which may be extended or retracted by the user. Extending or retracting the lifter (34) pivots the main boom (1) on the support column (8), and thereby lifts and lowers the main boom (1) and the hook (7) attached thereto. This allows the hoist to accomplish its purpose of lifting and lowering objects. Other means for lifting from the main boom (1) may be used. For example, various types of chain or cable pulley come-along configurations may be used to raise or lower objects from the main boom (1).

Figure 6:
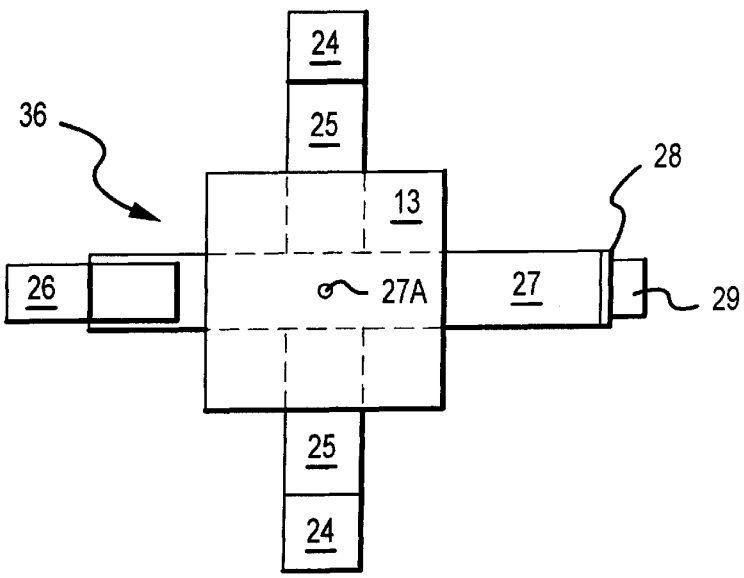
FIG. 6 is a top plan view of the base tubing according to an embodiment of the present invention.

The bracket (10) is rotatably attached to a turntable (13), the turntable being attached to a stabilizer base tubing (36) (see FIGS. 6, 10A and B). The turntable (13) is essentially a flat plate, which is preferably rectangular but may be of any other shape. The turntable (13) sits upon the stabilizer base tubing unit (36) and is preferably welded thereto.

The horizontal baseplate (12) of the bracket (10) and the turntable (13) have mounting holes (12B and 13B). A vertical bolt (15) downwardly extends through the horizontal baseplate (12), a bearing (14), the turntable (13) and the stabilizer base tubing (36) at hole (27A). The bearing (14) is centered by the bolt (15). The bearing (14) rests between the baseplate (12) and the turntable (13). The bearing (14) is preferably made of a low friction material, such as any of a number of hard plastics as are known in the art. Alternatively, a metal bearing may be used with suitable lubrication. In either event, the bearing (14) provides a low friction connection between the baseplate (12) and the turntable (13). Applying a rotative force to the bracket (10) (such as through the connected main boom (1)) rotates the bracket (12) around the turntable (13), and allows the main boom (1) to rotate a full 360 degrees.

A flat washer (17) is placed on the bolt (15) to provide additional strength. Then, a nut (16) is threaded onto the bolt (15) below the stabilizer base tubing (27). The nut (16) secures the baseplate (12) onto the turntable (13). This prevents the baseplate (12), the bearing (14) and turntable (13) from separating. Since the hoist is used to lift and move loads from a variety of positions, the hoist and in particular the interface between the baseplate (12), the bearing (14) and the turntable (13) is subject to shifting and possibly severe stresses; the fixed nut (16) on the bolt (15) prevents the hoist from collapsing.

Figure 7:
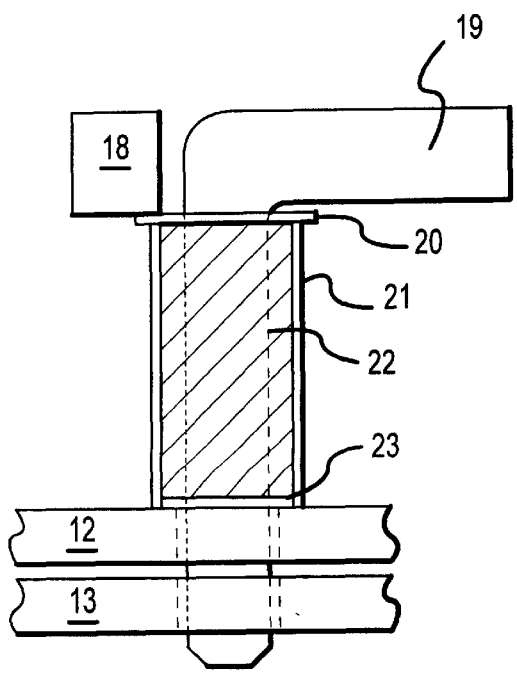
FIG. 7 is an elevation view of a bracket locking components according to an embodiment of the present invention.
Figure 8:
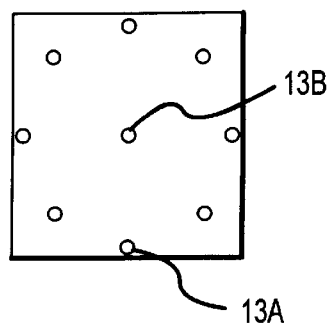
FIG. 8 is a top plan view of turntable according to an embodiment of the present invention.

A preferred locking device for the bracket (10) is shown in FIG. 7. A lock pin (19) extends through a washer (20), pipe (21), spring (22), washer (23), baseplate (12) and the turntable (13) when the unit is locked. The washer (20) provides a positive stop for the top of spring (22) and is welded to the top of pipe (21). The spring (22) provides for positive pressure at all times on pin (19). This makes the pin (19) lock into place when it comes into contact with the holes (13A) shown in FIG. 8. The washer (23) provides positive stop for the bottom of spring (22) and is welded to the pin(19). The pipe (21) is used to provide a sturdy alignment and mount for the lock pin (19) and is welded to the baseplate (12) at the location (12A). A lockstep (18) is used by rotating the pin (19) so that its handle rests on top of the lockstep (18), the lockstep being welded to the top of the washer (20). Use of the lockstep (18) allows the baseplate (12) to rotate 360 degrees without engaging the pin (19) through the holes (13A) in the turntable (13).

The stabilization unit (36) is most preferably a cross of tubing, having four projecting tube sections. A receiver extension tube (27) has an associated receiver mount (26) for attaching the hoist to a vehicle. The receiver mount (26) is preferably a telescoping tube that is welded partially within the extension tube (27). The receiver mount (26) may be adapted to attach to any standard vehicle hitch, or may be customized to attach to any non-standard hitch. Further, the receiver mount may be adapted to attach to structure other than a vehicle, such as to a receiving hitch mounted on a vertical wall or a loading dock. By adapted to attach, it is simply meant that suitable fasteners of any type, such as threaded nuts and bolts, may be used as known in the art to allow the mount (26) to be secured to a vehicle or other structure.

Figure 11:
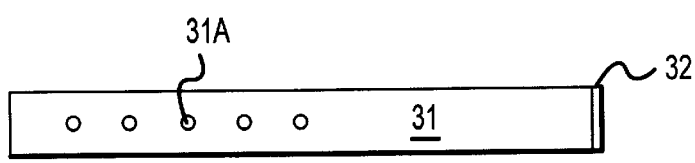
FIG. 11 is a side elevation view of an outrigger member according to an embodiment of the present invention.

On the end of tube (27) opposite of the receiver mount (26) is the mount for a jack (30). A plate (28) is welded to the end of the tube (27). A jack mount pipe (29) is welded to the plate (28). The jack (30) is attached to the jack mount pipe (29) with a pin. The jack (30) allows for proper placement of the outrigger legs (31) (as shown in FIG. 11) and also to relieve tension on the outrigger legs (31) for their removal after a load has been placed in the truck. Outrigger (31) is a tube having plurality of through holes (31A) spaced along its length, and foot (32) is for placing on a ground level and supporting the outrigger (31), thereby supporting the entire hoist. The height at which the outrigger (31) attaches through the sleeve (24) may be selected by the user by selecting the proper through-hole (31A) and is joined by a pin through the hole in the sleeve (24). The height may be selected based on a number of considerations, such as the height of a vehicle receiver hitch, any irregularities in the ground level, the height to which an object must be lifted by the hoist, and possibly other factors.

The receiver extension tube (27) utilizes a pair of side outrigger legs (25). The side outrigger legs (25) extend from the cross of the receiver extension tube (27) transverse to the direction of the jack (30). Each side outrigger leg (25) is attached by pin penetrating the holes (31A) and a corresponding hole in the sleeve (24). It should be apparent that the height of both outriggers legs (31) and the jack (30) should in general be equal, so that the hoist is level. However, it is possible that the hoist may be used on an uneven ground level, in which case the separate outriggers may be set to different heights to achieve an overall level position for the turntable (13).

In operation, the hoist is easily assembled, disassembled, and adjusted by the user. The steps described below do not need to be performed in the order presented; instead, they merely describe one representative scenario. The user may store the hoist primarily disassembled for minimum usage of storage space. The support column (8) may remain attached to the vertical plates (2) of the main boom (1) by the mounting pin, then folded into a parallel position with the boom (1). The boom extension (5) may be stored inside of the main boom (1) in a contracted state and pinned at the hole (3a).

The boom lifter (34) is detached from the main boom (1) and the bracket (10) for storage. The jack (30) is detached from the receiver extension tube (27) for storage. The outrigger legs (31) are detached from the sleeves (24) for storage. The unit then can be disengaged from the vehicle by removing the pin from the receiver mount (26). This procedure may be reversed to place the unit into operation. This unit is not recommended for use without a solid secure attachment of the receiver mount (26). The jack (30) and the outrigger legs (31) must be used and securely pinned and stabilized before the unit is used for lifting.

What is claimed is:

1. A hoist comprising:

a boom having a first end for moving an object and a second end;

means for engaging the object attached to the boom first end;

a support column having an end attached to the boom second end;

a bracket, the support column having an end other than the end attached to the boom that is attached to the bracket;

means for raising and lowering the boom, the means being attached to the boom and to the bracket;

a base unit for supporting the bracket, the base unit being attachable to a vehicle, the bracket being rotatable in relation to the base unit;

wherein the bracket has a flat base plate having a through-hole, the base unit has a bolt extending through the base plate through-hole about which the bracket rotates, a bearing is situated around the bolt and between the base unit and the flat base plate for reducing friction between the base unit and the bracket, and a nut is attached to the bolt to apply tension between the flat base plate and the base unit.

2. A hoist according to claim 1, wherein the support column is attachable to the boom at more than one position, the boom having a plurality of through holes in the end of the boom that attaches to the support column, the support column having at least one through hole in the end of the support column that attaches to the boom, and a removable pin penetrates one of the through holes of the boom and the hole for the support column to connect the support column and the boom at a desired position.

3. A hoist according to claim 1, wherein the boom comprises a tube having an exterior surface, two flat plates being welded to the exterior surface at the end of the boom that attaches to the support column, the plurality of through holes in the end of the boom that attaches to the support column being through the two flat plates.

4. A hoist according to claim 1, further comprising means for locking the bracket so that it is incapable of rotation.

5. A hoist according to claim 4, wherein the bracket locking means comprise: a pin for penetrating a through-hole in the base plate and a through-hole in the base unit, thereby fixing the base plate and the through hole in relation to one another; a spring for biasing the pin in a first position so that the pin is positively engaged in the base plate through-hole base unit through-hole; and a lockstep, the pin being capable of disposition against the lockstep so that the pin is disengaged from the base unit through-hole.

6. A hoist according to claim 1, wherein the base unit comprises four cross members extending from an intersection, one of the cross members having a receiver mount for attaching to the vehicle; a cross member extends from the intersection in the opposite direction from the cross member having the receiver mount, the cross member opposite the receiver mount supporting an outrigger for stabilizing the hoist; and two cross members extend laterally with respect to the cross member having the receiver mount and the cross member opposite therefrom, the two cross members extending laterally each supporting an outrigger for stabilizing the hoist.

7. A hoist according to claim 6, wherein the bracket attaches to the cross member having the receiver mount.

8. A hoist according to claim 7, wherein the outrigger height is adjustable.

9. A hoist according to claim 8, further comprising a jack mounted to the base unit for adjusting at least one of the outriggers.

10. A hoist according to claim 8, wherein the raising and lowering means is a hydraulic double action cylinder.

11. A hoist according to claim 1, wherein the support column is attachable to the bracket at more than one position, the support column having a plurality of through holes in the end of the support column that attaches to the bracket, the bracket having a plurality of through holes alignable with the plurality of through holes in the end of the support column that attaches to the bracket, and two removable pins penetrate two the plurality of through holes of the bracket and the support column to support column and the bracket at a desired position.

* * * * *